W. E. Lockwood.

Collar & Cuff.

Reissued June 6. 1865

No. 1980.

Witnesses:

Henry Howson

L. C. Hosh

Inventor:

William E. Lockwood

UNITED STATES PATENT OFFICE.

WILLIAM E. LOCKWOOD, OF PHILADELPHIA, PENNSYLVANIA.

IMPROVEMENT IN LADIES' COLLARS AND CUFFS.

Specification forming part of Letters Patent No. 23,771, dated April 26, 1859; Reissue No. 1,980, dated June 6, 1865.

DIVISION B.

*To all whom it may concern:*

Be it known that I, WILLIAM E. LOCKWOOD, of Philadelphia, Pennsylvania, did obtain Letters Patent of the United States, dated April 26, 1859, for Improvements in Collars and Cuffs and other Articles of Wearing Apparel; that I deem the said Letters Patent inoperative and invalid by reason of a defective and insufficient specification, and that I declare the following to be a full, clear, and exact description of that part of my invention, which consists of an embossed collar or cuff made of a fabric composed of paper and muslin, or of an equivalent fabric.

In carrying out my invention I use a fabric composed of paper and muslin, or an equivalent fabric having a smooth white polished or enameled surface to represent that of starched linen.

I will now proceed to describe one of the modes of manufacturing imitations of and substitutes for linen collars and cuffs and such other white and starched articles of wearing-apparel as are embroidered by needle and thread, or otherwise worked, or are so ornamented during their manufacture that portions are depressed and portions are in relief.

Figure 1:
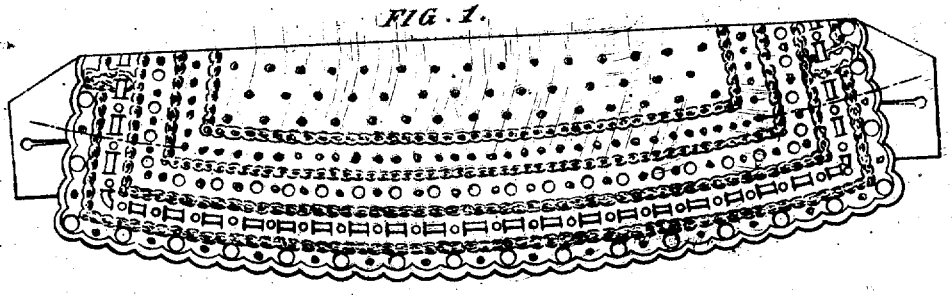
Figure 2:
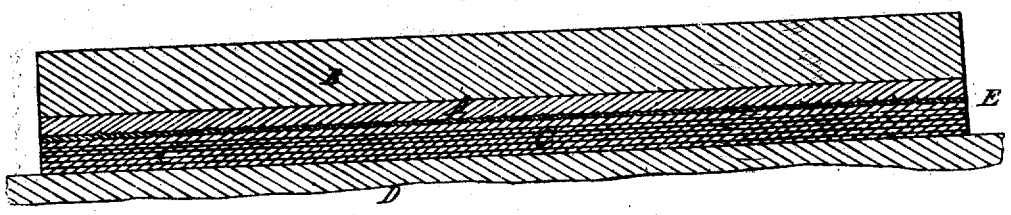

I first select the linen or muslin cuff or collar of the pattern which I desire to imitate, and this I stretch on, or cement to, a flat board with the embroidered or ornamented side uppermost. When dry, the surface of the cuff or collar is covered with a coating of plumbago or its equivalent and an electrotype taken from it. The counter die is made by pasting a number of pieces of paper together, and while they are in a damp state placing them on the platform D of any ordinary press, and then forcing the die onto the paper, and permitting it to remain in contact therewith until the paper is dry, when the die and counter-die are ready for use. A piece of the fabric above alluded to is then cut to the size of the desired imitation cuff or collar to be manufactured, and after being slightly moistened is placed on the counter-die, and the die pressed upon it, as seen in Fig. 2, where E represents the fabric.

Every projection and depression in the linen cuff or collar from which the electrotype is taken, every stitch, and even the marks of the threads of which the worked linen or muslin cuff is composed will be imparted to the said fabric, while the smooth, polished, or enameled white surface of the latter remains as an imitation of the starched surface of the linen.

After removal from the dies the edges of the cuff or collar may be trimmed, and holes for receiving the studs or other fastenings cut or punched out, when the cuff or collar is complete.

Instead of using flat dies, as shown in the drawing, two rollers, with the desired figures cut in relief in the surface of one and indented in that of the other, may be used.

It will be evident that the invention is applicable to shirt-bosoms, &c.

I do not confine myself to any particular appliances or machinery for embossing the fabric, but

I claim as my invention and desire to secure by Letters Patent—

As a new article of manufacture, an embossed collar or cuff made of a fabric composed of paper and muslin or an equivalent fabric.

In testimony whereof I have signed my name to this specification before two subscribing witnesses.

WILLIAM E. LOCKWOOD.

Witnesses:
HENRY HOWSER,
JOHN WHITE.